US006673431B1

(12) United States Patent
Ledzinski

(10) Patent No.: US 6,673,431 B1
(45) Date of Patent: Jan. 6, 2004

(54) HAND-RAIL

(75) Inventor: Janusz Ledzinski, Wimpassing (AT)

(73) Assignee: Semperit Aktiengesellschaft Holding (AT)

( * ) Notice: Subject to any disclaimer, the term of this patent is extended or adjusted under 35 U.S.C. 154(b) by 0 days.

(21) Appl. No.: 09/786,633

(22) PCT Filed: Aug. 27, 1999

(86) PCT No.: PCT/EP99/06308

§ 371 (c)(1), (2), (4) Date: Mar. 7, 2001

(87) PCT Pub. No.: WO00/15536

PCT Pub. Date: Mar. 23, 2000

(30) Foreign Application Priority Data

Sep. 11, 1998 (AT) .............................................. 1536/98

(51) Int. Cl.[7] .......................... D04H 1/00; D04H 13/00; D04H 3/00; D04H 5/00; B32B 13/02; B32B 13/10; B65G 15/00; B65G 17/00; B65G 23/22; B65G 23/01

(52) U.S. Cl. ............................... 428/292.1; 428/294.1; 198/16; 198/17; 198/337

(58) Field of Search ............................. 428/292.1, 294; 198/16, 17, 337

(56) References Cited

U.S. PATENT DOCUMENTS 3,623,590 A * 11/1971 Johnson ........................ 198/16
3,633,725 A * 1/1972 Smith .......................... 198/16
3,778,882 A * 12/1973 Cameron et al. ............. 29/450
3,949,858 A * 4/1976 Ballocci et al. ............... 198/16
4,776,446 A * 10/1988 Fisher et al. ................ 198/337
4,852,713 A * 8/1989 Tatai et al. ................. 198/337
4,983,453 A * 1/1991 Beall .......................... 428/294
5,160,009 A * 11/1992 Iyoda et al. ................ 198/337
5,255,772 A * 10/1993 Ball et al. .................. 198/337

FOREIGN PATENT DOCUMENTS

| | | |
|---|---|---|
| DE | 1756354 | 4/1970 |
| DE | 19641502 | 4/1998 |
| GB | 1351554 | 1/1974 |
| JP | 09086848 | 3/1997 |
| JP | 09315746 | 12/1997 |
| JP | 10152279 | 6/1998 |

* cited by examiner

*Primary Examiner*—Cynthia H. Kelly
*Assistant Examiner*—C Thompson
(74) *Attorney, Agent, or Firm*—Ostrolenk, Farber, Gerb & Soffen, LLP

(57) ABSTRACT

The invention relates to a hand-rail that can be used for escalators, moving pavements. The inventive hand-rail has a C-shaped cross-section, outer layers in the form of a sliding layer and a rubber top layer for the user, a layer with tractive support elements, especially steel chords that are embedded in rubber and oriented in a longitudinal direction, and at least one respective reinforcing layer extending into the lip areas on both sides of the tractive support elements. At least one of the reinforcing layers consists of a rubber layer with homogeneously distributed short fibers with a preferred orientation, extending at an angle deviating from 0° in relation to the longitudinal direction of the hand-rail.

27 Claims, 1 Drawing Sheet

HAND-RAIL

Figure 1:
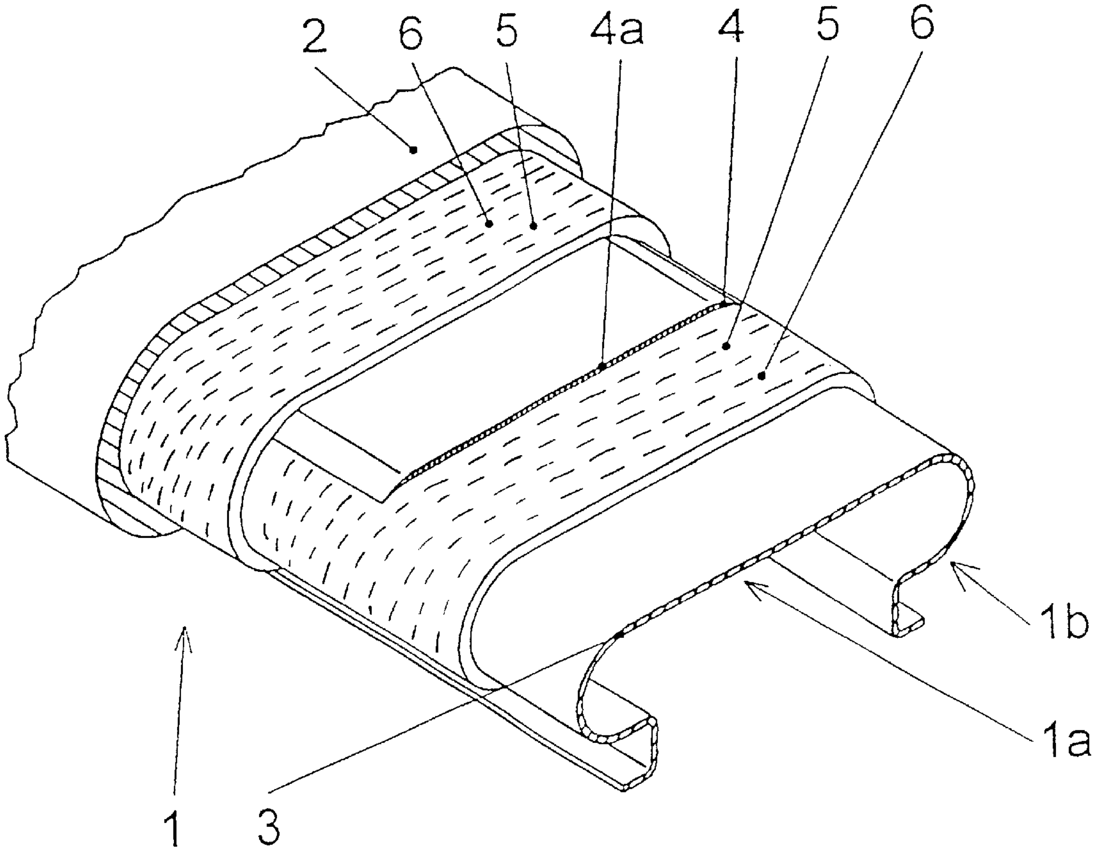

The present invention relates to a handrail for use with escalators, travelators and similar, which has a C-shaped cross-section, a sliding layer and a rubber covering layer for the user as external layers, also a layer exhibiting a tension carrier, more especially steel cords embedded in the rubber and oriented in the longitudinal direction, and at least one strengthening layer on each side of the tension carrier.

Handrails for escalators, passenger-conveying travelators and similar have to fulfil important functions. They must provide a stable and secure grip for people using the escalators and travelators and must be of a flexible design such that they can bend and be carried around the various driving rollers. Handrails must also be capable of withstanding stresses of several thousand Newton.

A handrail design of the type specified initially is known for example from U.S. Pat. No. 5,255,772. The type of handrail with C-shaped cross section disclosed there exhibits a tension carrier which consists of steel cords running parallel to each other in the longitudinal direction of the handrail, which are embedded in a rubber matrix. The sliding layer consists of a closely woven material, for example, cotton, polyamide or polyester, and must ensure that the handrail slides well on the guide rails. On each side of the tension carrier there are provided strengthening layers consisting of a woven material whose warp threads are oriented in the transverse direction of the handrail, thus at right angles to the tension carrier. The various weft threads provided merely serve to hold the warp threads together.

The necessary rigidity is supported by the C-shaped cross-section of the handrail. The lip width is specified so that the handrail can slide without the resistance being too high but the lip width tolerance must be sufficiently small that pinching of fingers or clothing cannot occur. Generally, handrails of known designs either tend to enlarge the lip distance, which can lead to pinching of fingers or clothing, or they tend to become narrower. In the latter case this can result in friction between the handrail and the rails, overheating and subsequently destruction of the handrail.

The problem for the invention is thus to develop a handrail for escalators and passenger-conveying travelators, having improved dynamic properties and improved dimensional stability and a longer life compared with known designs, which does not exhibit the afore-mentioned problems.

The problem set out is solved according to the invention by at least one of the strengthening layers being a rubber layer with uniformly distributed short fibres which exhibit a preferential orientation and run at an angle other than 0° to the longitudinal direction of the handrail.

The present invention provides a handrail having higher transverse rigidity, higher longitudinal flexibility, improved dimensional stability and more rigid lips compared with known designs. The material provided uniformly with short fibres used for the strengthening layers according to the invention impedes the appearance of various stresses which occur in conventional handrails during application of stress in the area of transitions from textile to rubber.

Moreover, the strengthening layers in the handrail are positioned such that the short fibres run at an angle other than 0° to the extension of the tension carrier. A strengthening layer according to the invention also contains no warp fibres which are present in conventionally constructed handrails in the strengthening layers of woven material. The absence of warp fibres gives the handrail constructed according to the invention an excellent elasticity in the longitudinal direction with higher transverse rigidity at the same time. In addition, for the handrails according to the invention the change in the lip width both under positive bending and also under bending via the handrail back (negative bending) is substantially smaller than for conventionally constructed handrails. Handrails constructed according to the invention are easy to manufacture, have a considerably longer life than known designs and are generally safer to operate than known designs.

According to a preferred embodiment of the invention, the short fibres in the strengthening layers are oriented such that they run at an angle to the longitudinal direction of the handrail, which differs from the longitudinal direction of the handrail by at least 30°, and more especially by at least 45°. An orientation of the short fibres in these regions is an advantage for the elasticity in the longitudinal direction and also for high transverse rigidity.

A handrail according to the invention can be executed differentially depending on requirements and intended usage. In particular, on one or on both sides of the tension carrier layer there can be provided at least one each, more especially two strengthening layer(s) each, provided with short fibres.

The rigidity of the handrail according to the invention is favourably influenced if the short fibres in the neighbouring strengthening layers cross and form preferably the same angles with the longitudinal direction of the handrail. An alternative to this can be a design where the short fibres in neighbouring strengthening layers run parallel to each other.

In order to achieve the desired transverse rigidity, longitudinal flexibility and dimensional stability it is favourable if the fraction of short fibres is between 10 and 40 parts by weight, more especially between 15 and 30 parts by weight, relative to 100 parts by weight of rubber in the mixture.

As regards the material for the short fibres, this can be a synthetic material such as nylon, polyester, polyvinyl alcohol, aromatic polyamide, carbon, a mineral material such as glass or a natural material such as cotton. The short fibres used can also be a fibre mixture comprising fibres of different materials. The rigidity of the strengthening layers can thus be co-determined by the choice of fibre type and the mixture ratio of possible different fibres.

The ratio of the fibre length to the fibre diameter is also a co-determining factor for the rigidity of the layers. This ratio should be between 50 and 300 for the fibres used.

Depending on the intended usage and other requirements and also depending on the fibre material, fibre fraction etc, the strengthening layers in the finished handrail ultimately have a thickness between 0.8 and 5 mm.

Other features, advantages and details of the invention will now be described in greater detail with reference to the drawings and mixture examples.

Figure 2:
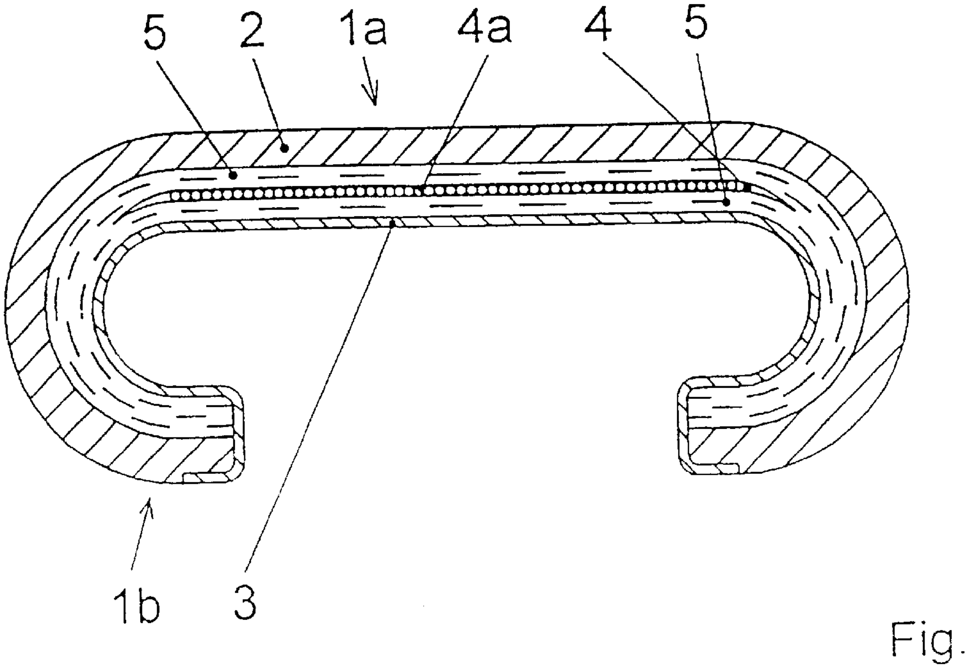

FIG. 1 shows an oblique view of an embodiment of a handrail according to the invention where the individual layers are removed stepwise to show the construction of the handrail and FIG. 2 shows a cross-section through the handrail according to FIG. 1.

The handrail 1 shown in the drawings has the conventional C-shaped cross-section and thus comprises a flat, transversely extending centre section 1*a* with adjacent inward-bending lips 1*b* on each side. A handrail 1 of this design is usually used for passenger-carrying escalators or travelators. The lips 1*b* grip around the guide rail of the escalator or travelator not shown here.

The handrail 1 has a multilayer structure which will now be described in greater detail.

On one outer side the handrail 1 possesses the usual rubber covering layer 2 to support the hand of the escalator or travelator user and on the other outer side the handrail 1 is provided with a sliding layer 3 which comes in contact with the guide rail not shown here. The sliding layer 3 can have the usual construction for the handrail 1 according to the invention and can consist of closely woven cotton, polyamide or polyester fabric to ensure that the handrail 1 slides easily on the guide rail. Between the sliding layer 3 and the covering layer 2 the handrail 1 consists of other layers which give it the necessary transverse rigidity and the necessary longitudinal flexibility.

In the design shown in the two drawings three further layers are provided between the rubber covering layer 2 and the sliding layer 3 of which the central one is a rubber layer 4 running only in the centre section 1*a* in which steel cords 4*a* are embedded, running in the longitudinal direction of the handrail 1. In another possible embodiment not shown here the layer 4 can run into the lip regions but then has no strength carrier. The steel cords 4*a* form the tension carriers of the handrail 1. Normally, and as shown in the drawings, a single layer of steel cords 4*a* is provided, running adjacent to each other in the layer 4.

On each side of the tension carrier layer 4 and in each case between the covering layer 2 and the sliding layer 3 and also running into the lip regions 1*b* there is provided a strengthening layer 5 each implemented according to the invention. The strengthening, layers 5 have the tension carrier layer 4 embedded between them and on each side of the layer 4 or in the lip regions 1*b* they form a uniform layer. The layers 5 consist of a rubber mixture in which short fibres 6 are embedded. In addition the short fibres 6 exhibit a preferred orientation, they are largely oriented in a single direction whereby the layers 5 in the example of embodiment shown are embedded in the handrail 1 such that the short fibres 6 run in the transverse direction of the handrail 1, and are therefore positioned at right angles to the longitudinal direction and to the orientation of the tension carrier.

Depending on the implementation or the intended usage the layers 5 are of corresponding thickness. In the finished vulcanised handrail a strengthening layer 5 is usually between 0.8 and 5 mm thick, more especially up to 3 mm thick. The raw plates of fibre-strengthened mixture are constructed in a manufacturing process by calendering to a thickness of 0.5 to 0.8 mm which ensures good orientation of the fibres. In order to produce a thicker strengthening layer 5 in the finished handrail several, more especially up to four, thin calendered plates are either doubled after calendering or positioned one on top of the other during construction of the handrail 1. In the case of thin layers 5 when these have a thickness of approximately 0.8 mm, it may be necessary to fill out the cross-sectional regions immediately adjacent to the, tension carrier layer 4 with separate strips of the mixture for the layers 5. In the case of thicker layers 5 their volume is generally sufficient to adequately fill these cross-sectional regions. As regards the orientation of the fibres in the filling strips, in the present example of embodiment these would have the same orientation as the fibres in the layers 5.

The two examples of a rubber mixture for the manufacture of strengthening layers 5 contained in the following tables will be used to explain further characteristic features of the same in greater detail. The fractions of the various components quoted are parts by weight each relative to 100 parts by weight of rubber in the mixture.

Mixture example 1:

| CONSTITUENT | FRACTION |
|---|---|
| CR sulphur modified | 100 |
| Soot N 550 | 45 |
| Short cotton fibres | 15 |
| Short nylon fibres | 5 |
| Softeners | 6 |
| Anti-ageing agents | 3 |
| MgO | 3 |
| ZnO | 6 |
| Accelerators | 0.5 |
| Sulphur | 1 |
| Cross-linking agents | 0.5 |

Mixture example 2:

| CONSTITUENT | FRACTION |
|---|---|
| SBR | 70 |
| NR | 30 |
| Soot N330 | 30 |
| Short cotton fibres | 10 |
| Short nylon fibres | 5 |
| Short PVA fibres | 5 |
| Aromatic softeners | 5 |
| Anti-ageing agents | 1.5 |
| Stearic acid | 1 |
| ZnO | 6 |
| Accelerators | 1 |
| Sulphur | 4 |

For the polymer the mixture according to example 1 is based on polychloroprene rubber while the mixture according to example 2 is based on styrenebutadiene rubber and natural rubber, whereby these are only examples and thus preferred types of rubber. In addition, in example 2 the fraction of SBR can be between 30 and 80 parts by weight and the fraction of natural rubber therefore between 20 and 70 parts by weight. Both mixtures also contain softeners, whose fraction can be up to 20 parts by weight. The rubber mixtures also contain the usual additives such as anti-ageing agents, magnesium oxide, stearic acid, zinc oxide, accelerators, sulphur and if necessary cross-linking agents whereby these additives are added in the usual quantities. The soot fraction can be between 20 and 70 parts by weight.

As regards the aforesaid short fibres 6, the rubber mixture according to mixture example 1 contains 5 parts by weight of short nylon fibres and 15 parts by weight of short cotton fibres, in each case relative to 100 parts by weight of rubber in the mixture. The mixture according to mixture example 2 contains a mixture of short cotton fibres (10 parts by weight), short nylon fibres (5 parts by weight) and short PVA fibres (5 parts by weight). Thus, in addition to fibres of synthetic material such as carbon, nylon, polyester and aromatic polyamide (Kevlar) there are also fibres of a mineral material such as glass and natural fibres such as cotton. The total fraction of fibres in the mixture is selected as between 10 and 40 parts by weight, more especially between 15 and 30 parts by weight. In addition, fibres of different material combinations can be added but also only a single type of fibre can be used. The length of the fibres embedded in the strengthening layers 5 is generally between 1 and 12 mm. In addition, the ratio of the fibre length to the fibre diameter is more especially a factor determining the rigidity of the layers 5. For the fibres used this ratio should be between 50 and 300.

The rigidity of the fibre-strengthened layers 5 can thus be determined or adjusted by selecting the type of fibre, the mixing ratio of possible different fibres, the fraction of fibres, the length of the fibres and the ratio of the length to the diameter. The finished strengthening layer 5 obtained after vulcanisation from such rubber mixtures possesses a hardness of at least 75 Shore A, more especially at least 80 Shore A.

The fibres can be used uncoated or with a rubber-friendly coating, for example RFI (resorcin formaldehyde latex). The purpose of the coating is to improve the adhesion between the fibre material and the rubber matrix. The short fibres 6 added to the raw rubber mixture are oriented in a specific direction, for example, by a calendering process. Good orientation of the fibres in the rubber mixture is generally achieved by calendering the mixture to a thickness of 0.5 to 0.8 mm. In order to achieve thicker layers, many calendered layers are used. Extrusion through a broad-slit nozzle is also suitable for orienting the fibres.

In the example of embodiment according to the drawings a strengthening layer 5 with short fibres 6 according to the invention is provided both above and below the layer 4 containing the tension carrier. The number or total thickness of the strengthening layers 5 is determined on the one hand by the rigidity of an individual layer 5 and on the other hand by the transverse rigidity to be achieved.

If, as is shown, there is one layer 5 respectively above and below the layer 4 exhibiting the tension carrier, these are preferentially configured so that the short fibres 6 run at a right angle to the longitudinal direction of the handrail 1 or the tension carrier. In any case the orientation of the short fibres 6 is selected so that they form an angle other than 0° with the longitudinal direction of the handrail 1. It is particularly advantageous if the angle deviates by at least 30°, more especially by at least 45°, from the longitudinal direction.

If, for example, two layers 5 are provided respectively above and below the layer 4, it is advantageous if the two strengthening layers 5 provided above or below the layer 4 respectively are positioned in the handrail 1 so that the short fibres 6 of one layer 5 are oriented at an acute angle to the longitudinal direction of the handrail 1 and the second strengthening layer 5 is used such that its short fibres 6 run preferably at the same angle relative to the longitudinal direction but in the other direction. This yields a crossing configuration of short fibres 6 in these two neighbouring layers 5. The orientation of the short fibres 6 for the other two layers 5 can be continued so that in the lip regions 1*b* where layers 5 combine a crossing configuration is again obtained. However, the positioning of all the layers 5 or only some of the layers 5 can be such that their short fibres 6 run at right angles to the longitudinal direction of the handrail 1.

Strengthening layers 5 according to the invention form uniformly constructed strengthening layers which give the handrail 1 extremely good elasticity in the longitudinal direction combined with high transverse rigidity. This uniform strengthening material above and below the tension carrier impedes the appearance of various stresses which may occur, for example, in conventional handrails as a result of transitions from textile to rubber during stressing, whereby a longer life is achieved for the handrails according to the invention. Changes in lip width both under positive bending and under bending via the handrail back (negative bending) are also minimised because of the absence of embedded warp threads. Furthermore, buckling of the layers as can occur in conventionally constructed handrails is eliminated by the new design. Also the emergence of fabric plies at the rubber surface, as can occur in conventional designs, can no longer occur in handrails designed according to the invention.

Another important advantage of the new design is obtained during construction of the joint. Fabric overlaps which form an inhomogeneity and point of weakness in the handrail in conventionally constructed handrails do not occur in the design according to the invention. The junction points are designed so that the strengthening layers 5 according to the invention are butt-jointed at an angle of between 30 and 90° only in the longitudinal direction or are overlapped whereby the junction point fuses during vulcanisation and no inhomogeneous point can form in the handrail. Problems with moisture absorption which frequently occur in conventional designs with textile inserts are also eliminated in the design according to the invention.

The particularly high hardness of the fibre-strengthened rubber material gives the handrail a high transverse rigidity and the very high viscosity of the rubber mixture prevents the rubber material from penetrating through the sliding layer which can lead to increased friction between the sliding layer and the guide rail in conventional handrails.

What is claimed is:

1. Handrail for use with escalators, travelators and similar, which has a C-shaped cross-section with a centre section and lip regions, a sliding layer and a rubber covering layer for the user as external layers, a tension carrier layer oriented in a longitudinal direction, and at least one strengthening layer on each side of the tension carrier layer and running into the lip regions, characterised in that at least one of the strengthening layers is a rubber layer having uniformly distributed short fibres which exhibit a preferential orientation and run at an angle other than 0° to the longitudinal direction of the handrail.

2. Handrail according to claim 1, characterised in that the short fibres run at an angle to the longitudinal direction of the handrail which differs by at least 30° from the longitudinal direction of the handrail.

3. Handrail according to claim 1, characterised in that on each side of the tension carrier layer there are provided at least two strengthening layers provided with short fibres.

4. Handrail according to claim 3, characterised in that the short fibres in neighboring strengthening layers cross whereby the angles formed by the short fibres in these layers with the longitudinal direction of the handrail are the same in magnitude but opposite in sense.

5. Handrail according to claim 3, characterised in that the short fibres in neighboring strengthening layers run parallel to each other.

6. Handrail according to claim 1, characterised in that each said strengthening layer is made of a rubber mixture whose fraction of short fibres is between 10 and 40 parts by weight relative to 100 parts by weight of rubber in the mixture.

7. Handrail according to claim 6, characterised in that the fraction of short fibres is between 15 and 30 parts by weight.

8. Handrail according to claim 1, characterised in that the short fibres are a mixture of fibres of different materials.

9. Handrail according to claim 1, characterised in that fibres are used whose ratio of length to diameter is between 50 and 300.

10. Handrail according to claim 1, characterised in that each said strengthening layer has a thickness between 0.8 and 5 mm.

11. Handrail according to claim 1, wherein said tension carrier layer comprises steel cords embedded in rubber and oriented in the longitudinal direction.

12. Handrail according to claim 2, wherein said angle differs by at least 45° from the longitudinal direction of the handrail.

13. Handrail according to claim 12, wherein said angle differs by 90° from the longitudinal direction of the handrail.

14. Handrail according to claim 1, characterised in that each side of the tension carrier layer is provided with at least one strengthening layer provided with short fibres.

15. Handrail according to claim 14, characterised in that the short fibres run at an angle to the longitudinal direction of the handrail which differs by at least 30° from the longitudinal direction of the handrail.

16. Handrail according to claim 15, wherein said angle differs by at least 45° from the longitudinal direction of the handrail.

17. Handrail according to claim 16, wherein said angle differs by 90° from the longitudinal direction of the handrail.

18. Handrail according to claim 1, characterised in that at least one side of the tension carrier layer is provided with at least two strengthening layers provided with short fibres.

19. Handrail according to claim 18, characterised in that the short fibres in neighboring strengthening layers cross whereby the angles formed by the short fibres in these layers with the longitudinal direction of the handrail are the same in magnitude but opposite in sense.

20. Handrail according to claim 18, characterised in that the short fibres in neighboring strengthening layers run parallel to each other.

21. Handrail according to claim 18, characterised in that the short fibres run at an angle to the longitudinal direction of the handrail which differs by at least 30° from the longitudinal direction of the handrail.

22. Handrail according to claim 21, wherein said angle differs by at least 45° from the longitudinal direction of the handrail.

23. Handrail according to claim 22, wherein said angle differs by 90° from the longitudinal direction of the handrail.

24. Handrail according to claim 1, wherein said short fibres comprise at least one of a synthetic material, carbon, a mineral material, and a natural material.

25. Handrail according to claim 24, wherein said mineral material is glass.

26. Handrail according to claim 24, wherein said natural material is cotton.

27. Handrail according to claim 24, characterised in that the synthetic material comprises one of nylon, polyester, polyvinyl alcohol, and aromatic polyamide.

* * * * *

UNITED STATES PATENT AND TRADEMARK OFFICE

CERTIFICATE OF CORRECTION

PATENT NO. : 6,673,431 B1
DATED : January 6, 2004
INVENTOR(S) : Ledzinski

It is certified that error appears in the above-identified patent and that said Letters Patent is hereby corrected as shown below:

Column 7,
Line 1, please change “2” to -- 1 --.

Signed and Sealed this

Twenty-first Day of December, 2004

JON W. DUDAS
*Director of the United States Patent and Trademark Office*

UNITED STATES PATENT AND TRADEMARK OFFICE

CERTIFICATE OF CORRECTION

PATENT NO. : 6,673,431 B1 
APPLICATION NO. : 09/786633
DATED : January 6, 2004
INVENTOR(S) : Ledzinski It is certified that error appears in the above-identified patent and that said Letters Patent is hereby corrected as shown below:

<u>Column 6</u>

Lines 33-34, please change "other than 0°" to -- which differs by at least 30° --.

Delete lines 35-38.

Signed and Sealed this

Sixth Day of November, 2007

JON W. DUDAS

*Director of the United States Patent and Trademark Office*